Jan. 21, 1964     A. F. WORMSER     3,118,277
RAMJET GAS TURBINE

Filed Sept. 26, 1960     2 Sheets-Sheet 1

INVENTOR.
ALEX F. WORMSER

BY Kenway, Jenney, Hildreth

ATTORNEYS

Jan. 21, 1964     A. F. WORMSER     3,118,277
RAMJET GAS TURBINE
Filed Sept. 26, 1960     2 Sheets-Sheet 2
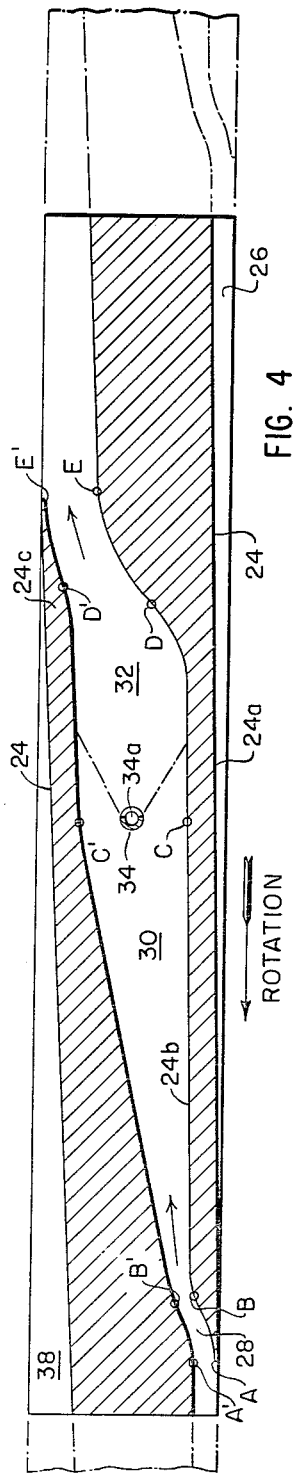
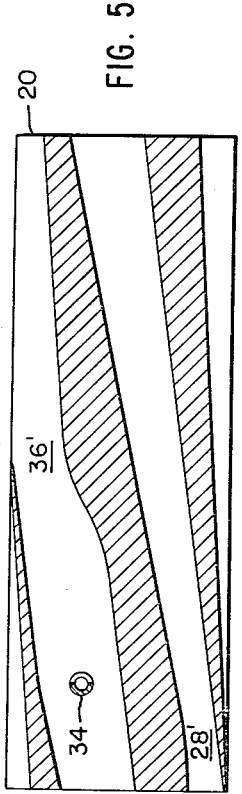
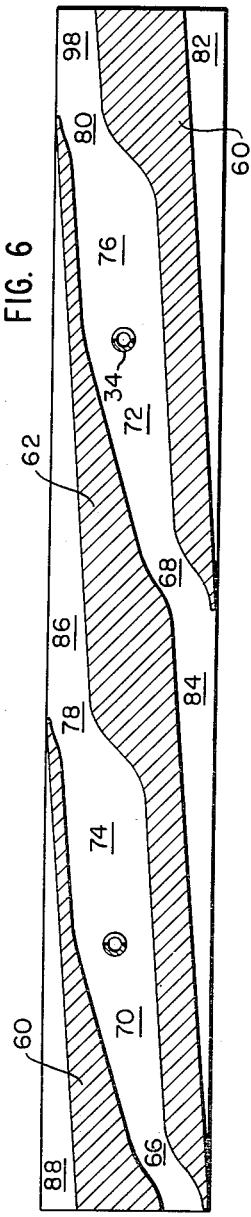
*INVENTOR.*
ALEX F. WORMSER
BY Kenway, Jenney & Hildreth
ATTORNEYS 3,118,277
RAMJET GAS TURBINE
Alex F. Wormser, Nahant, Mass., assignor to Wingaersheek Turbine Co., Inc., Swampscott, Mass., a corporation of Massachusetts
Filed Sept. 26, 1960, Ser. No. 58,374
4 Claims. (Cl. 60—39.35)

My invention relates to an improved gas turbine. More particularly it relates to a gas turbine which includes a ramjet and which is particularly designed for low power applications. As used herein, and in the claims, "low" power means power in the range extending from fraction of a horsepower to 100 horsepower.

Gas turbines of conventional design generally comprise a compressor, a combustion chamber and a turbine. The compressor and turbine may each have several rows of blading, each row having a large number of blades, e.g., 50 to 100. To obtain low power with axial flow gas turbines of this design it has, in the past, been the practice to reduce the radial height of the blades thereby diminishing air flow and reducing the power of the unit. However, for the very low power ranges, such as those for which my improved gas turbine is designed, the radial height of the blades becomes so small that the air leakage occurring because of blade tip clearance becomes a very large percentage of the total air flow with a resulting substantial diminution in efficiency. Also the very short blades are extremely difficult to manufacture with precision, and they operate at a low Reynolds number, which results in high friction losses. In an effort to overcome these problems, radial flow machines are conventionally used for low power gas turbines. However, the minimum conventional axial flow machines are of about 30 horsepower and the minimum size for any gas turbine including radial flow machines is about 10 horsepower because of the problems of small, inefficient passages in both types of machines. In general prior to my invention, no practical gas turbine operating at the lower levels of the power range mentioned above has been available, and those in the higher ranges are expensive to build and operate.

A low power gas turbine which is relatively inexpensive in construction and operation would have many applications. For example, because of the relative ease of starting after a long period of non-use and low maintenance requirements, they would be ideal for standby or emergency power sources. Gas turbines are extremely reliable, have extremely long life, and may be used as power sources in remote locations where reliability and maintenance free operation are a necessity. A typical example of these requirements is the use of such low power engines at remote natural gas wells. The gas from the well may be used to fuel the engine, and it in turn may rotate a generator to supply power for measuring instruments, telemetering equipment, or other similar applications. In general, only very small amounts of power are required, the gas being pumped by its own pressure; however, the remote location demands trouble free and reliable operation. Conventional piston type internal combustion engines require excessive maintenance for this application and low power gas turbines have not, prior to my invention been available.

Accordingly, it is a principal object of my invention to provide a low power gas turbine. A further object of my invention is to provide a gas turbine of the type described whose efficiency is sufficiently high so that practical operation is feasible. A further object of my invention is to provide a low power engine of extreme reliability and long life. Still a further object of my invention is to provide an engine of the type described of simple but rugged construction and low manufacturing cost. Other and further objects of my invention will in part be obvious and will in part appear hereinafter.

The invention accordingly comprises the features of construction, combination of elements, and arrangement of parts which will be exemplified in the constructions hereinafter set forth, and the scope of the invention will be indicated in the claims.

For a fuller understanding of the nature and objects of the invention, reference should be had to the following detailed description taken in connection with the accompanying drawing in which:

FIG. 4 is a developed plan view of the periphery of the engine of FIGS. 1, 2 and 3 with the shroud removed;

FIG. 5 is a developed plan view similar to FIG. 4 of a second embodiment of an engine made according to my invention; and FIG. 6 is a developed plan view similar to FIG. 4 of an engine made according to my invention having two blades.

In general, a low power gas turbine made according to my invention includes a rotatably mounted hub. Either one or several blades are helically formed about the periphery of the hub. In the single bladed version, the blade is substantially longer than 360° and is shaped so that the two opposed surfaces in the overlapping region of the blade form an inlet passage, a diffusion region (herein termed a "diffuser") a combustion chamber and a nozzle thus forming a ramjet about the periphery of the hub. Fuel is supplied to the combustion chamber through the interior of the hub. An annular ring forming a shroud surrounds the outer periphery of the blade thereby enclosing the inlet, diffuser, combustion chamber and nozzle of the ramjet.

To start the engine it is necessary to rotate the hub at a fairly high speed and to ignite the fuel supply. Thereafter, as in a conventional ramjet the reaction force resulting from the hot exhaust gases leaving the wheel via the exit nozzle at a velocity higher than that of the incoming air causes the entire hub to rotate. Air scooped up by the inlet at one end of the channel due to the rotation of the rotor is compressed in the diffuser and burned with fuel in the combustion chamber to generate the exhaust gases.

Figure 2:
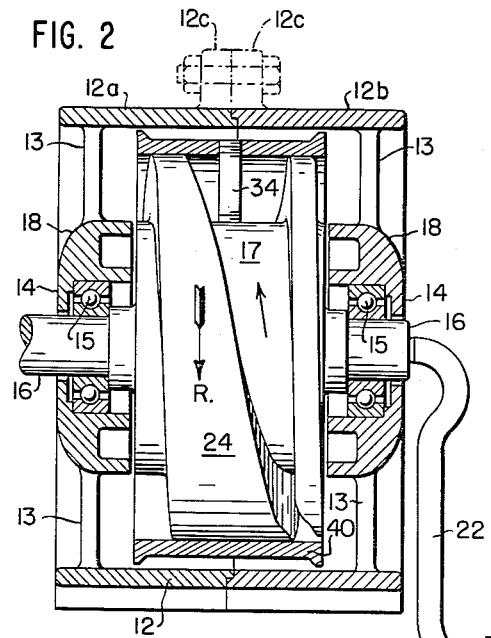
FIG. 2 is an end elevation of one end of the engine of FIG. 1 the engine support being in section along the line 2—2 and the rotor being in full line.
Figure 3:
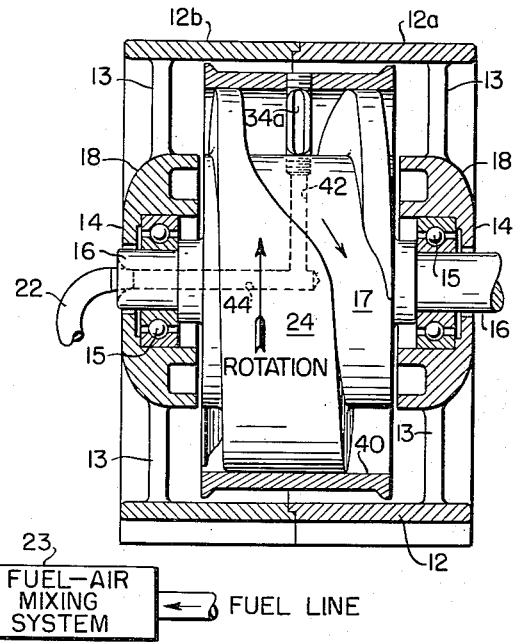
FIG. 3 is an end elevation similar to FIG. 2 of the opposite end of the engine shown in FIG. 1, the engine support being in section along the line 3—3, the rotor being in the same position as in FIG. 1.
Figure 1:
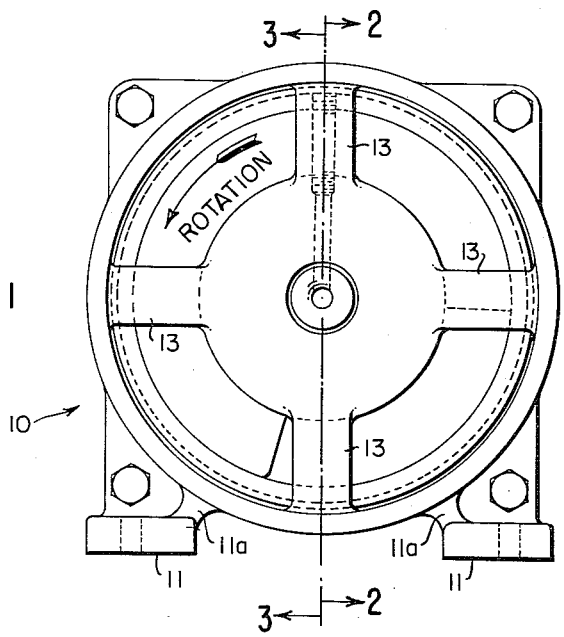
FIG. 1 is a side elevation of a ramjet gas turbine made according to my invention.

As best seen in FIGS. 1, 2 and 3, the engine of my invention includes a support generally indicated at 10, which includes a base member 11 with an external annular ring 12 secured thereto. The ring is secured in any conventional manner, as by welding, to a fillet 11a, which is shown as being integral with the base member 11. The ring 12 is actually split including two sections 12d and 12b (as seen in FIG. 2) each section including a flange 12c. This construction facilitates engine assembly as will be apparent hereinafter. A plurality of struts 13, herein shown as four, extend inwardly toward the axis of the annular ring 12 from its inner surface and support a bearing block 14 at the center. If desired, the ring sections 12a or 12b, the struts 13 and bearing block 14 may all be cast as a single unit, or they may be separately formed and assembled by known methods.

A bearing 15 is carried in each of the supports and journals the stub shafts 16 which are secured to a hub 17. The hub 17 is substantially a right cylinder in shape and is supported by the shafts 16 and bearings 15 for rotation with its axis parallel to the base member 11. Two "bell mouths" 18 which are cup-shaped members having an outer diameter substantially the same as the hub 17 and whose open tops face toward the side of the hub 17 are provided to direct the air flow from outside the engine to the outer periphery of the hub, and to keep exhaust gases from the bearings, all as will be apparent from the further description below.

As shown in FIG. 3, one stub shaft 16 is hollow and a fuel-air supply line 22 is connected to the opening formed in the end thereof by a suitable rotary seal. An explosive mixture of fuel and air is supplied from a fuel air mixing system of suitable type 23 which in turn is supplied with air and fuel such as natural gas, kerosene, gasoline, etc.

A blade 24, whose general shape can best be seen in FIG. 4, is helically formed about the periphery of the hub 17, and because of its shape forms an inlet scroll, an inlet, a diffuser, a combustion chamber, an exit nozzle and an exit scroll, the inlet, diffuser, combustion chamber and nozzle being referred to herein collectively as the "channel." It will be observed that in the design illustrated the radial height of the blade 24 is the same about the entire periphery of the hub, and the blade extends a total of about 1¾ times around the hub, i.e. its peripheral length is approximately 630°. The principal elements of the engine are formed in the channel between the two opposing surfaces of the blade 24 in the 270° where it overlaps itself.

The lower surface 24a of the blade 24 (as seen in FIG. 4) touches one edge of the hub at the edge A. As blade 24 progresses away from the direction of rotation (to the right in FIG. 4) the lower surface 24a slopes inwardly from the edge of the hub at edge A for almost 360° until at a line A' (which lies in a plane passing through A and perpendicular to the surface 24a) it has been displaced by the distance shown to form the inlet entrance. A and A' are shown as points in FIG. 4, being the ends of lines extending across the surface 24a. The helical outer surface 24a of the blade 24 forms a scroll whose function will be hereinafter described.

As the surface 24a continues to the right of line A' in FIG. 4 it is displaced from the upper surface 24b of the blade 24 to form an S-shaped inlet channel 28, which inlet channel extends from the lines A—A' to the lines B—B'. The two surfaces 24a and 24b diverge from the lines B—B' to the lines C—C' to form the diffuser region 30. From C—C' to the lines D—D' the two surfaces 24a and 24b of the blade 24 are substantially parallel and form the combustion chamber 32. A flame holder 34, to be described in greater detail below is located at the entrance to the combustion chamber.

The two surfaces 24a and 24b are curved as shown between the lines D—D' and E—E' to form a converging exit nozzle 36. The surface 24a terminates at the line E'. However surface 24b continues at a slight pitch for another 360° until it too reaches the upper edge (as seen in FIG. 4) of the hub 17, the last 360° of rotation of surface 24b forming the exit scroll 38. The pitch angle of the outlet scroll portion of 24b is such that a plane through lines E—E' is perpendicular to surface 24b at line E'.

The outer peripheral surface of the blade 24 is covered by a shroud 40 (FIGS. 1, 2 and 3) which defines the periphery of the channel whose sides are defined by the overlapping portions of the blade 24. The radial inner surface of the channel is formed by the periphery of the hub 17.

As mentioned above, a flame holder 34 is positioned at the entrance to the combustion chamber and comprises a tube, having threaded ends. The inner end of the tube is threaded into a passage 42 in the hub 17. The passage 42 extends radially outwardly to the periphery of the hub from its center. At the center, the passage 42 intersects a second passage 44 (FIG. 3) which extends axially from the center of the hub through the stub shaft 16 to the mixture inlet line 22. The downstream side of the tube forming the flame holder is removed, as at 34a to allow fuel to pass into the combustion chamber. The outer end of the flame holder is threaded into a tapped hole in the rotating shroud 40.

The fuel is thus supplied to the combustion chamber by passing through the fuel air mixing device 23 and the mixture through line 22, axial passage 44, radial passage 42 and the opening 34a formed in the downstream side of the flame-holder.

In operation, means (not shown) such as an electric starter are utilized to cause the hub 17 to spin at a sufficiently rapid rate to cause the air to be scooped up by the inlet, supplied to the diffuser 30, and compressed therein. At the same time fuel is supplied to the combustion chamber. The fuel-air mixture supplied to the combustion chamber is ignited by supplying heated gas (as from a gas burner) to the engine until the mixture ignites or in any conventional fashion such as with a spark plug.

The exhaust gases from the burned fuel exiting at high speed through the nozzle 36, result in a force which is applied substantially tangentially to the hub causing it to rotate and produce shaft power, the exhaust gases being directed away from the engine bearings by the bell mouth 18 on the exhaust side of the engine.

The inlet scroll 26, extending for about 360° around the hub serves to efficiently guide external air into the inlet entrance A—A'; it also serves to separate the exhaust gases and the inlet air. The inlet 28 is shown as substantially constant in cross section: diffusion is not permitted in the inlet in order that separation of air from the inlet wall or diffuser wall may be prevented. The function of the inlet is to displace the air so that the blade 24 can be of sufficient thickness and also to provide inlet air to the diffuser at the proper air angle. Accordingly, the inlet is somewhat S-shaped, the entrance A—A' being perpendicular to the scroll and the exit B—B' being perpendicular to the center line of the diffuser. The S-shape, while not required, is preferred since it avoids the slimly tapered leading edge which would otherwise form the leading edge of blade 24. The S-shaped inlet thereby alleviates problems of flutter and vibration at high peripheral velocities.

In the diffuser 30 the relative velocity of the air diminishes and the static air pressure increases because of the increasing cross-section as the air progresses toward the combustion chamber. The area of highest static pressure is then immediately adjacent to the inlet of the combustion chamber. As mentioned above and as seen in FIGS. 3 and 4 the combustion chamber 32 has substantially straight sides and in this region the fuel-air mixture from the fuel-air mixing device is burned with air leaving the diffuser.

The hot products of combustion leaving the combustion chamber are passed through the nozzle 36 to the exit scroll. As seen in FIGS. 3 and 4, the nozzle is also S-shaped to displace the exhaust gases by the thickness of the trailing edge generally indicated at 24c. Additionally, the nozzle 38 does not have a constant cross-section but gradually narrows downstream. This construction increases the absolute and relative velocity of the gases leaving the combustion chamber. The high velocity gases generate a driving torque because of their reaction on the blade, much as in a jet engine. The exhausted gases leave the nozzle exit E—E' and are directed away from the nozzle by the outlet scroll 38.

While I have described the hub 17 and blade 24 as separate structures, it will be apparent that they may be integral, the channel including inlet, diffuser, combustion chamber and nozzle, and the entrance and exit scrolls being milled in a single cylindrical member.

Although I have described a structure in which the total overlap (and therefore the total channel length) of the blade, is about 270°, this amount may be varied depending upon the thickness of the hub and the desired length of the inlet, diffuser, combustion chamber and nozzle. Thus, in FIG. 5, I have shown a developed view of the periphery of an engine made according to my invention in which the blade makes a total of 2½ revolutions, and the channel has a peripheral length of 540° as compared to the 270° of FIG. 4. It will be observed that in contrast to FIG. 4, the hub 20 is thicker.

Further, although I have shown an inlet 28 and a nozzle 36 in FIG. 4 as being S-shaped, it is to be understood that this shape has been chosen to provide the described displacement of the air and exhaust gases while still providing relatively thick leading and trailing edges. Alternatively, the inlet and nozzle may have a simple curve as shown in FIG. 5, the inlet being identified as 28' and the nozzle by 36' therein, the curve being chosen to increase the axial component of velocity in the incoming air, and to decrease this component in the case of the exit nozzle.

In FIG. 6 I have illustrated an engine similar to that shown in FIGS. 1 through 4 except that the engine of FIG. 6 is provided with two blades 60 and 62, each of which is helically formed about the periphery of the hub. The two blades form a pair of inlets 66 and 68, a pair of diffusers 70 and 72, two combustion chambers 74 and 76 and a pair of nozzles 78 and 80. Inlet scrolls 82 and 84 are provided for inlets 66 and 68 respectively, as are outlet scrolls 86 and 88 for the nozzles.

As shown in FIG. 6 each blade forms a complete inlet and outlet scroll, and in the portion in which it overlaps the other blade forms between their opposed surfaces the ramjet channel. In the embodiment shown, each blade is helically wound about the hub for approximately 320° and is overlapped by the other blade for about 140° of its length. Thus the inlet and outlet scrolls in FIG. 6 are each of almost 180° in length. The scroll length for larger numbers of blades will in each instance be slightly less than 360°/n where n is the number of blades. The construction details and the operation of the engine of FIG. 6 are substantially the same as the engine of FIG. 4. Because two blades are used rather than a single blade the engine is inherently balanced and will provide greater power in a given size. As noted above a greater number of blades may be provided to provide requisite power.

While I have indicated preferable shapes for the elements of the engine the illustrated designs are not to be considered as limiting. For example, in engines of the type described, the inlet may be shaped to expand, turn and/or diffuse the air in any order, rather than merely turning it. Further the walls of the diffuser portion need not be straight but may be curved. The nozzle and exit need not be combined as shown, but may instead be separated with a separate nozzle feeding an exit passage of substantially constant cross-section, similar to the inlet passages illustrated. The design illustrated is for subsonic flow, but it is to be understood that at high peripheral velocities the channel elements may be designed in accordance with known aerodynamic principles for internal supersonic inlets and nozzles. Such designs will generally provide a diffuser and a nozzle having a converging diverging shape.

The blade height may be varied and the blade walls may be curved to provide desired shapes for efficient operation. Air or liquid cooling may be provided in accordance with known practice. Boundary layer control by means of bleed holes, slots, vortex generator vanes or wedges may also be provided in accordance with known practice, all without departing from my invention.

Finally, the rotating shroud 40 shown in FIGS. 1, 2 and 3 may be omitted if close tolerance is maintained between the outer periphery of the blade 24 and the stationary shroud 12.

Thus, I have provided a low power ramjet gas turbine of extremely simple design that is made by forming a single helical blade on the hub, or by a number of such blades, the components of the turbine being formed between and defined by the hub surface, the opposed surfaces of the overlapping portions of the blades and a rotating shroud fitted over the blade periphery. Fuel is supplied to the combustion chamber through a rotary seal and passages formed in the hub.

A typical single blade engine of the type shown in FIGS. 1 through 4 has a hub diameter of approximately 3 inches, an overall diameter of about 3½ inches and a thickness of 3 inches, the blade traversing the periphery 1¾ times as shown in FIGS. 1–4. The device is fueled with natural gas and operated at about 50,000 r.p.m. This engine provides about 1/10 horsepower with a maximum temperature of 800° F. at the nozzle entrance. The thermal efficiency is not high on an absolute basis, being about 3%; however it may be raised to about 10% by raising the maximum temperature to about 1400° F. It is estimated that this engine will operate continuously for approximately two years without service or attendance of any kind.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A ramjet axial flow gas turbine comprising a rotor hub, means supporting said rotor hub for rotation about its center, means forming a channel having a bounded cross section extending diagonally around and across the periphery of said rotor hub, said means including a single upstanding blade formed on the periphery of said rotor hub and extending helically around the periphery of said rotor hub for more than 360°, said channel being formed by the overlapping portions of said blade and including in series flow relationship an air inlet, a diffuser, a combustion chamber and a nozzle, said air inlet being of substantially constant cross section in the direction of air flow, said diffuser increasing in cross section in the direction of air flow, and said nozzle diminishing in cross section in the direction of air flow; an inlet scroll for said air inlet, said inlet scroll extending about the edge of said rotor hub for substantially 360° and being formed by one surface of said blade.

2. The combination defined in claim 1 which includes an outlet scroll, said outlet scroll extending about the edge of said rotor hub adjacent said nozzle and being formed by the surface of said blade opposite to the surface forming said inlet scroll.

3. A ramjet axial flow gas turbine comprising, in combination, a rotor hub, means supporting said rotor hub for rotation about its center, means forming a plurality of channels of number n, extending diagonally around and across the periphery of said rotor hub, said means including n upstanding blades formed on the periphery of said rotor hub and extending helically around the periphery of said rotor hub for more than $360°/n$, said channels being of bounded cross section and having sides formed by the overlapping portions of said blades, each of said channels including, in series flow relationship, an air inlet of substantially constant cross section in the direction of air flow, a diffuser of increasing cross section in the direction of air flow, a combustion chamber and a nozzle of diminishing cross section in the direction of air flow, an inlet scroll for each of said air inlets, each of said inlet scrolls extending about the periphery of said rotor hub for substantially $360°/n$ and being formed by a surface of said blades.

4. The combination defined in claim 3 which includes $n$ outlet scrolls, said outlet scrolls extending about the edge of said rotor hub adjacent a nozzle and being formed by surfaces of said blades opposite to the surfaces defining said inlet scrolls.

References Cited in the file of this patent

UNITED STATES PATENTS

| | | |
|---|---|---|
| 2,499,863 | Hart | Mar. 7, 1950 |
| 2,644,301 | Karlby | July 7, 1953 |

FOREIGN PATENTS

| | | |
|---|---|---|
| 471,671 | Great Britain | Sept. 8, 1937 |
| 598,774 | Great Britain | Feb. 26, 1958 |